US012789585B2

(12) United States Patent
Takeyama

(10) Patent No.: US 12,789,585 B2
(45) Date of Patent: Nov. 10, 2026

(54) THERMAL MANAGEMENT SYSTEM FOR VEHICLE

(71) Applicant: KABUSHIKI KAISHA TOYOTA JIDOSHOKKI, Kariya (JP)

(72) Inventor: Yukihiro Takeyama, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 106 days.

(21) Appl. No.: 19/024,126

(22) Filed: Jan. 16, 2025

(65) Prior Publication Data

US 2025/0346093 A1 Nov. 13, 2025

(30) Foreign Application Priority Data

May 8, 2024 (JP) ................................ 2024-075760

(51) Int. Cl.
*B60H 1/00* (2006.01)
*B60H 1/32* (2006.01)

(52) U.S. Cl.
CPC ..... *B60H 1/00885* (2013.01); *B60H 1/00278* (2013.01); *B60H 1/00807* (2013.01); *B60H 1/3227* (2013.01)

(58) Field of Classification Search
CPC ............ B60H 1/00885; B60H 1/00278; B60H 1/00807; B60H 1/3227; B60H 1/00392; B60H 1/32284; B60H 1/00385; B60H 1/3211; B60H 1/3228; B60H 2001/00307
See application file for complete search history.

(56) References Cited

U.S. PATENT DOCUMENTS

| | | | | |
|---|---|---|---|---|
| 11,358,436 | B2 * | 6/2022 | Aikawa | B60H 1/00392 |
| 11,364,767 | B2 * | 6/2022 | Kitamura | B60H 1/04 |
| 11,413,931 | B2 * | 8/2022 | Yano | B60H 1/00007 |
| 11,760,154 | B2 * | 9/2023 | Miyoshi | B60H 1/00007 62/159 |
| 2020/0290431 | A1 | 9/2020 | Aikawa et al. | |
| 2021/0387506 | A1 * | 12/2021 | Miyoshi | B60H 1/32284 |

FOREIGN PATENT DOCUMENTS

| | | |
|---|---|---|
| JP | 2014-218135 A | 11/2014 |
| JP | 2020-147161 A | 9/2020 |

* cited by examiner

*Primary Examiner* — Marc E Norman
(74) *Attorney, Agent, or Firm* — Sughrue Mion, PLLC

(57) ABSTRACT

A thermal management system includes: an antifreeze circuit; a battery; a chiller; and a controller. The antifreeze circuit includes: a heat exchanger; a cooling core; a first flow passage connected to the chiller and the heat exchanger; a second flow passage connected to the heat exchanger and the cooling core; and a bypass passage through which an antifreeze flows toward the cooling core while bypassing the heat exchanger. The heat exchanger cools the battery. The cooling core cools air supplied to a passenger compartment. An upstream end and a downstream end of the bypass passage are respectively connected to the first flow passage and the second flow passage. The controller controls so that a temperature of the antifreeze flowing through the cooling core does not decrease to a temperature equal to or lower than 0° C. when the cooling core cools the air.

3 Claims, 4 Drawing Sheets

THERMAL MANAGEMENT SYSTEM FOR VEHICLE

CROSS-REFERENCE TO RELATED APPLICATION

This application claims priority to Japanese Patent Application No. 2024-075760 filed on May 8, 2024, the entire disclosure of which is incorporated herein by reference.

The present disclosure relates to a thermal management system for a vehicle.

BACKGROUND ART

Japanese Patent Application Publication No. 2020-147161 mentions a known thermal management system for a vehicle. This thermal management system is installed in an electric vehicle. The thermal management system includes a refrigerant circuit, a low-temperature circuit, a high-temperature circuit, a battery, a chiller, and a controller. The refrigerant circuit is capable of circulating refrigerant. The low-temperature circuit and the high-temperature circuit are each capable of circulating a coolant. The battery supplies power to a travelling motor of the electric vehicle.

The refrigerant circuit includes a compressor, a first heat exchanger, an expansion valve, and an evaporator. The compressor compresses the refrigerant. The first heat exchanger transfers heat between the refrigerant compressed by the compressor and the coolant circulating through the high-temperature circuit to cool the refrigerant. The expansion valve depressurizes the refrigerant cooled by the first heat exchanger. The evaporator transfers heat between the surrounding air and the refrigerant to cool the air.

The low-temperature circuit includes a second heat exchanger, a low-temperature radiator, a bypass passage, a flow rate adjustor, a first temperature sensor, and a second temperature sensor. The second heat exchanger transfers heat from the battery to the coolant to cool the battery. The low-temperature radiator transfers heat between the coolant passed through the second heat exchanger and the air outside the vehicle to cool the coolant. The bypass passage allows the coolant to flow toward the low-temperature radiator while bypassing the second heat exchanger. The flow rate adjustor adjusts a flow rate of the coolant flowing through the second heat exchanger and a flow rate of the coolant flowing through the bypass passage. The first temperature sensor measures a temperature of the battery. The second temperature sensor measures a temperature of the coolant upstream of the second heat exchanger and the bypass passage.

The chiller is connected to the refrigerant circuit and the low-temperature circuit. The chiller and the evaporator are arranged in parallel in the refrigerant circuit. In the low-temperature circuit, the chiller is located upstream of the second heat exchanger and the bypass passage in the flow direction of the coolant. The chiller transfers heat between the coolant circulating in the low-temperature circuit and the refrigerant circulating in the refrigerant circuit to cool the coolant. The controller is connected to the first temperature sensor, the second temperature sensor, and the flow rate adjustor, and controls the operation of the flow rate adjustor.

In this thermal management system, the second heat exchanger transfers heat between the battery and the coolant cooled by the chiller to cool the battery. The controller controls the operation of the flow rate adjustor based on the temperature of the battery measured by the first temperature sensor. Further, in this thermal management system, the air cooled by the heat transfer in the evaporator is supplied to the inside of the passenger compartment to cool the passenger compartment.

Such a thermal management system typically uses alternatives to chlorofluorocarbons as a refrigerant circulating in the refrigerant circuit. However, in order to prevent global warming, it is recommended to use a refrigerant with a lower global warming potential instead of alternatives to chlorofluorocarbons. Such refrigerants may be highly flammable or toxic to living organisms. If a highly flammable refrigerant or toxic refrigerant is used, the evaporator for heat transfer between the refrigerant and the air cannot be placed in the passenger compartment from the viewpoint of protecting the passengers of the vehicle.

One option to solve such a circumstance is that a cooling core having the same function as the evaporator is provided in the low-temperature circuit and a low temperature coolant flows to the cooling core through the bypass passage while bypassing the second heat exchanger. This allows for cooling the air supplied to the passenger compartment, even if a highly flammable refrigerant or toxic refrigerant is used in the thermal management system.

The thermal management system uses the chiller to cool the coolant to a temperature lower than 0° C. in order to sufficiently cool the high temperature battery. When the high temperature battery and the passenger compartment are cooled simultaneously, the coolant at a temperature lower than 0° C. flows to the cooling core through the bypass passage, which leads to a risk that frost may form on the cooling core. The frost on the cooling core may prevent satisfactory heat transfer between the coolant and the air in the cooling core in the thermal management system, thereby decreasing the passenger compartment cooling performance. If the chiller cools the coolant to a temperature higher than 0° C. in order to prevent formation of the frost on the cooling core, the cooling capacity of the high temperature battery decreases.

In order to solve these problems in a circumstance in which the second heat exchanger and the cooling core are provided in the low-temperature circuit, two chillers for heat transfer between the refrigerant and the coolant may be disposed to cool coolants and distribute the coolants respectively to the second heat exchanger and the cooling core. That is, one of the chillers cools the coolant to a temperature lower than 0° C. to cool the high temperature battery, and the other of the chillers cools the coolant to a temperature higher than 0° C. to prevent frost on the cooling core. However, this complicates the configuration of the thermal management system and needs to increase the size of the thermal management system. This therefore complicates the installation of the thermal management system into the vehicle.

The present disclosure, which has been made in light of the above-mentioned circumstance, is directed to providing a thermal management system for a vehicle, the thermal management system having excellent battery cooling performance and passenger compartment cooling performance while using a highly flammable refrigerant or toxic refrigerant, and being easy to install in the vehicle.

SUMMARY

In accordance with an aspect of the present disclosure, there is provided a thermal management system for a vehicle. The thermal management system includes: a refrigerant circuit through which a refrigerant circulates; an antifreeze circuit through which an antifreeze circulates; a battery for supplying power to the vehicle; and a chiller connected to the refrigerant circuit and the antifreeze circuit. The chiller is configured to transfer heat between the antifreeze and the refrigerant to cool the antifreeze. The refrigerant has flammability or toxicity. The refrigerant circuit includes: a compressor for compressing the refrigerant; a first heat exchanger for cooling the refrigerant compressed by the compressor; and an expansion valve for depressurizing the cooled refrigerant and directing the depressurized refrigerant to the chiller. The antifreeze circuit includes: a second heat exchanger; a cooling core; a first flow passage; a second flow passage; a third flow passage; a bypass passage through which the antifreeze flows toward the cooling core while bypassing the second heat exchanger; and a flow rate adjustor. The second heat exchanger is disposed downstream of the chiller in a flow direction of the antifreeze, and configured to transfer heat between the battery and the antifreeze to cool the battery. The cooling core is disposed in a passenger compartment of the vehicle. The cooling core is disposed downstream of the second heat exchanger in the flow direction of the antifreeze and configured to transfer heat between air supplied to the passenger compartment and the antifreeze to cool the air. The first flow passage is connected to the chiller and the second heat exchanger. The second flow passage is connected to the second heat exchanger and the cooling core. The third flow passage is connected to the cooling core and the chiller. The flow rate adjustor is configured to adjust a flow rate of the antifreeze that flows through the second heat exchanger and a flow rate of the antifreeze that flows through the bypass passage. The thermal management system includes: a first temperature sensor for measuring a temperature of the battery; a second temperature sensor for measuring a temperature of the air; and a controller. The controller is connected to the first temperature sensor, the second temperature sensor, and the flow rate adjustor, and configured to control the flow rate adjustor based on measurement results of the first temperature sensor and the second temperature sensor. An upstream end and a downstream end of the bypass passage in the flow direction of the antifreeze are respectively connected to the first flow passage and the second flow passage. The controller controls the flow rate adjustor so that a temperature of the antifreeze flowing through the cooling core does not decrease to a temperature equal to or lower than 0° C. when the cooling core cools the air.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the embodiments together with the accompanying drawings in which.

DETAILED DESCRIPTION OF THE EMBODIMENTS

The following will describe an embodiment of the present disclosure in detail with reference to the accompanying drawings.

Figure 1:
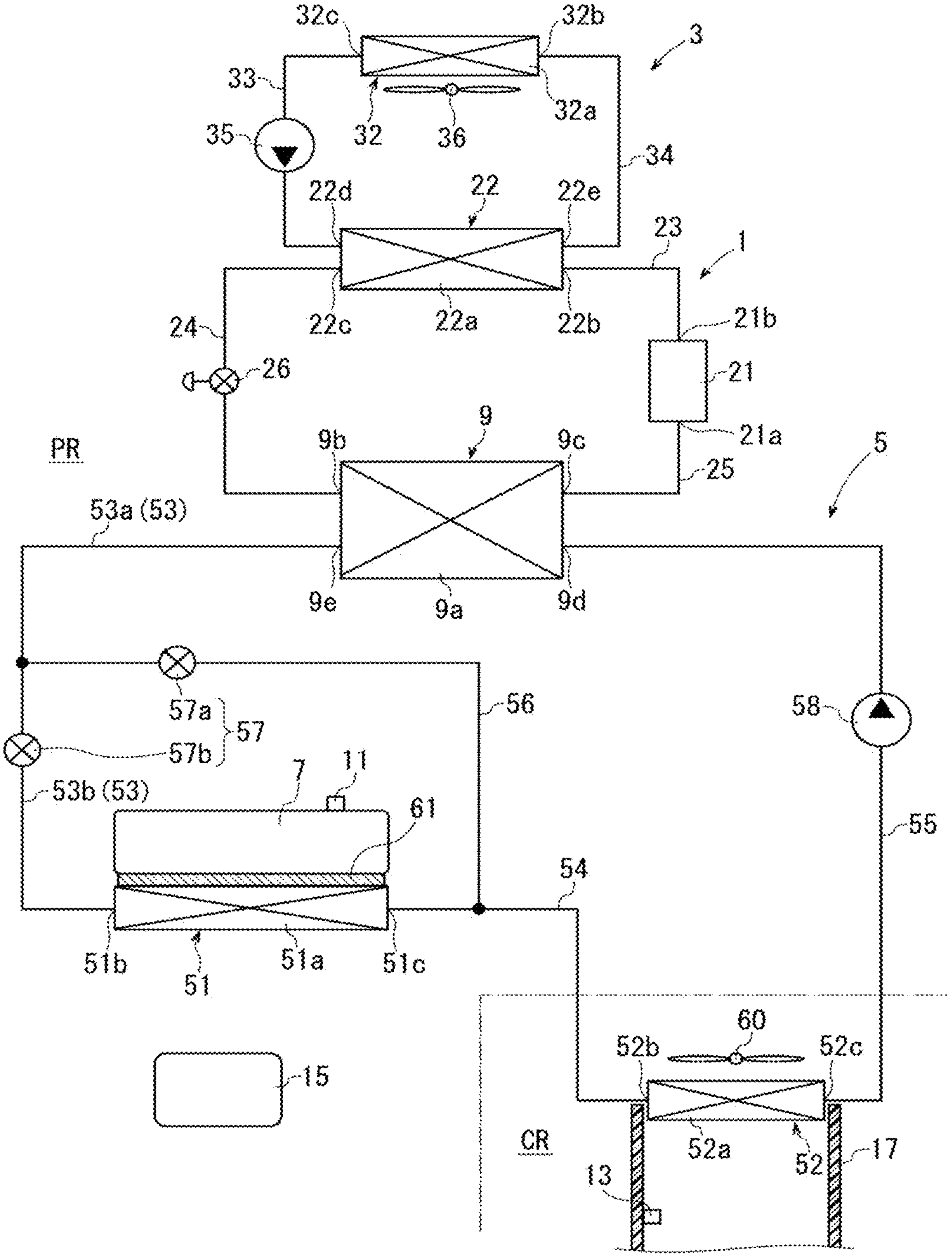
FIG. 1 is a schematic diagram of a thermal management system for a vehicle according to an embodiment of the present disclosure.

As illustrated in FIG. 1, a thermal management system for a vehicle according to the present embodiment includes a refrigerant circuit 1, a heat dissipation circuit 3, an antifreeze circuit 5, a battery 7, a chiller 9, a first temperature sensor 11, a second temperature sensor 13, and a controller 15. The thermal management system is installed in an electric vehicle (not illustrated).

The refrigerant circuit 1 includes a compressor 21 for compressing a refrigerant, a condenser 22 for cooling the refrigerant compressed by the compressor 21, pipes 23, 24, 25, and an expansion valve 26 for depressurizing the cooled refrigerant and directing the depressurized refrigerant to the chiller 9. The condenser 22 serves as the first heat exchanger of the present disclosure. The refrigerant circuit 1, specifically, the compressor 21, the condenser 22, the pipes 23, 24, 25, and the expansion valve 26 are disposed in a powertrain compartment PR of an electric vehicle. In the electric vehicle, the powertrain compartment PR is separated from a passenger compartment CR for a driver and passengers. The powertrain compartment PR accommodates electrical components (not illustrated), such as a travelling motor and a motor generator for driving the electric vehicle. In other words, the refrigerant circuit 1 is disposed outside the passenger compartment CR in the electric vehicle.

The compressor 21 is a known electric scroll compressor. The compressor 21 includes a compression mechanism (not illustrated). The compressor 21 has a suction port 21*a* and a discharge port 21*b*. The compressor 21 draws the refrigerant through the suction port 21*a*, and compresses the refrigerant with the compression mechanism. The compressor 21 discharges the compressed refrigerant from the discharge port 21*b*. In the thermal management system according to the present embodiment, the refrigerant circulating in the refrigerant circuit 1 has toxicity, or a flammability higher than the flammability of alternatives to chlorofluorocarbons and specified chlorofluorocarbons. Specifically, the thermal management system according to the present embodiment uses propane as a highly flammable refrigerant. The compressor 21 may be a known compressor, such as an electric vane compressor.

The condenser 22 has a condenser main body 22*a*, a first inlet 22*b*, a first outlet 22*c*, a second inlet 22*d*, and a second outlet 22*e*. The refrigerant and antifreeze flow inside the condenser main body 22*a*. The condenser main body 22*a* has the first inlet 22*b* on the upstream side in the flow direction of the refrigerant. The condenser main body 22*a* has the first outlet 22*c* on the downstream side in the flow direction of the refrigerant. The condenser main body 22*a* has the second inlet 22*d* on the upstream side in the flow direction of the antifreeze. The condenser main body 22*a* has the second outlet 22*e* on the downstream side in the flow direction of the antifreeze.

The pipe 23 is arranged between the compressor 21 and the condenser 22, and is connected to the discharge port 21*b* of the compressor 21 and the first inlet 22*b* of the condenser 22. The pipe 24 is arranged between the condenser 22 and the chiller 9, and is connected to the first outlet 22*c* of the condenser 22 and a sixth inlet 9*b* of the chiller 9. The pipe 25 is arranged between the chiller 9 and the compressor 21, and is connected to a sixth outlet 9*c* of the chiller 9 and the suction port 21*a* of the compressor 21.

The expansion valve 26 is provided in the pipe 24. The expansion valve 26 depressurizes the refrigerant cooled by the condenser 22 and flowing through the pipe 24 from the first outlet 22*c*, and allows the depressurized refrigerant to flow toward the chiller 9. The expansion valve 26 adjusts a depressurization amount of the refrigerant by changing an open degree of the expansion valve 26.

The pipes 23, 24, 25 allow the refrigerant to circulate through the refrigerant circuit 1 while flowing through the compressor 21, the condenser 22, the expansion valve 26, and chiller 9 in this order. The sixth inlet 9*b* and the sixth outlet 9*c* of the chiller 9 will be described later.

The heat dissipation circuit 3 is disposed in the powertrain compartment PR. The heat dissipation circuit 3 includes a radiator 32, pipes 33, 34, and a first pump 35.

The radiator 32 includes a radiator main body 32*a*, a third inlet 32*b*, and a third outlet 32*c*. The antifreeze flows inside the radiator main body 32*a*. The radiator main body 32*a* has the third inlet 32*b* on the upstream side in the flow direction of the antifreeze. The radiator main body 32*a* has the third outlet 32*c* on the downstream side in the flow direction of the antifreeze. A first fan 36 is disposed near the radiator 32.

The pipes 33, 34 are disposed between the radiator 32 and the condenser 22. The pipe 33 is connected to the third outlet 32*c* of the radiator 32 and the second inlet 22*d* of the condenser 22. The pipe 34 is connected to the second outlet 22*e* of the condenser 22 and the third inlet 32*b* of the radiator 32.

The first pump 35 is provided in the pipe 33. The first pump 35 directs the antifreeze to the condenser 22 through the pipe 33. In the heat dissipation circuit 3, the pipes 33, 34 and the first pump 35 allow the antifreeze to circulate through the radiator 32 and the condenser 22. The first pump 35 may be provided in the pipe 34 to direct the antifreeze to the radiator 32 through the pipe 34.

The antifreeze circuit 5 includes a battery cooling device 51, a cooling core 52, pipes 53, 54, 55, a bypass passage 56, a valve unit 57, and a second pump 58. The battery cooling device 51 serves as the second heat exchanger of the present disclosure. The pipe 53 serves as the first flow passage of the present disclosure. The pipe 54 serves as the second flow passage of the present disclosure. The pipe 55 serves as the third flow passage of the present disclosure. The valve unit 57 serves as the flow rate adjustor of the present disclosure.

The battery cooling device 51 is disposed downstream of the chiller 9 in a flow direction of the antifreeze. The battery cooling device 51 includes a cooling device main body 51*a*, a fourth inlet 51*b*, and a fourth outlet 51*c*. The antifreeze flows inside the cooling device main body 51*a*. The cooling device main body 51*a* has the fourth inlet 51*b* on the upstream side in the flow direction of the antifreeze. The cooling device main body 51*a* has the fourth outlet 51*c* on the downstream side in the flow direction of the antifreeze.

The cooling core 52 is disposed downstream of the battery cooling device 51 in the flow direction of the antifreeze. The cooling core 52 has a cooling core main body 52*a*, a fifth inlet 52*b*, and a fifth outlet 52*c*. The antifreeze flows inside the cooling core main body 52*a*. The cooling core main body 52*a* has the fifth inlet 52*b* on the upstream side in the flow direction of the antifreeze. The cooling core main body 52*a* has the fifth outlet 52*c* on the downstream side in the flow direction of the antifreeze. A second fan 60 is disposed near the cooling core 52.

The pipe 53 is disposed between the chiller 9 and the battery cooling device 51, and connected to the chiller 9 and the battery cooling device 51. The pipe 53 includes an upstream pipe 53*a* and a downstream pipe 53*b*. The upstream pipe 53*a* forms the upstream portion of the pipe 53 in the flow direction of the antifreeze. The upstream end of the upstream pipe 53*a* in the flow direction of the antifreeze is connected to a seventh outlet 9*e* of the chiller 9. The seventh outlet 9*e* of the chiller 9 will be described later.

The downstream pipe 53*b* forms the downstream portion of the pipe 53 in the flow direction of the antifreeze. The upstream end of the downstream pipe 53*b* in the flow direction of the antifreeze is connected to the downstream end of the upstream pipe 53*a* in the flow direction of the antifreeze. The downstream end of the downstream pipe 53*b* in the flow direction of the antifreeze is connected to the fourth inlet 51*b* of the battery cooling device 51. Accordingly, the pipe 53 is connected to the seventh outlet 9*e* of the chiller 9 and the fourth inlet 51*b* of the battery cooling device 51.

The pipe 54 is disposed between the battery cooling device 51 and the cooling core 52 and connected to the fourth outlet 51*c* of the battery cooling device 51 and the fifth inlet 52*b* of the cooling core 52. The pipe 55 is disposed between the cooling core 52 and the chiller 9, and connected to the fifth outlet 52*c* of the cooling core 52 and a seventh inlet 9*d* of the chiller 9. The seventh inlet 9*d* of the chiller 9 will be described later.

The upstream end of the bypass passage 56 in the flow direction of the antifreeze is connected to the pipe 53. More specifically, the upstream end of the bypass passage 56 is connected to the downstream end of the upstream pipe 53*a* and the upstream end of the downstream pipe 53*b*. The downstream end of the bypass passage 56 in the flow direction of the antifreeze is connected to the pipe 54.

The valve unit 57 is configured to adjust the flow rate of the antifreeze flowing through the battery cooling device 51 and the flow rate of the antifreeze that flows through the bypass passage 56. The valve unit 57 includes a first flow control valve 57*a* and a second flow control valve 57*b*. The first flow control valve 57*a* is provided in the bypass passage 56. The second flow control valve 57*b* is provided in the downstream pipe 53*b*. The first flow control valve 57*a* and the second flow control valve 57*b* are operable to open and close.

The first flow control valve 57*a* opens to allow the bypass passage 56 to be opened. The first flow control valve 57*a* changes its open degree to adjust the flow rate of the antifreeze flowing through the bypass passage 56. Specifically, the first flow control valve 57*a* increases the open degree to increase the flow rate of the antifreeze flowing through the bypass passage 56, or decreases the open degree to decrease the flow rate of the antifreeze flowing through the bypass passage 56. The first flow control valve 57*a* minimizes the open degree (i.e., 0 degrees) to close. The first flow control valve 57*a* closes to close the bypass passage 56.

Similarly, the second flow control valve 57*b* opens to open the downstream pipe 53*b*. The second flow control valve 57*b* increases its open degree to increase the flow rate of the antifreeze flowing through the downstream pipe 53*b*, or decreases the open degree to decrease the flow rate of the antifreeze flowing through the downstream pipe 53*b*. The second flow control valve 57*b* minimizes its open degree (i.e., 0 degrees) to close the downstream pipe 53*b*.

The second pump 58 is provided in the pipe 55. The second pump 58 directs the antifreeze to the chiller 9 through the pipe 55. The second pump 58 may be provided in the upstream pipe 53*a* to allow the antifreeze to flow from the upstream pipe 53*a* to the downstream pipe 53*b* and the bypass passage 56.

The pipes 53, 54, 55, the bypass passage 56, and the second pump 58 allow the antifreeze to circulate through the antifreeze circuit 5 while flowing through the chiller 9, the battery cooling device 51, and the cooling core 52 in this order.

In the antifreeze circuit 5, the bypass passage 56 allows the antifreeze to flow from the chiller 9 to the cooling core 52. That is, in the antifreeze circuit 5, the antifreeze flows from the chiller 9 toward the cooling core 52 through the bypass passage 56 while bypassing the battery cooling device 51. Accordingly, the antifreeze flowing through the bypass passage 56 is not heated when the battery 7 is cooled.

In the antifreeze circuit 5, the battery cooling device 51 is disposed downstream of the chiller 9 in the flow direction of the antifreeze. The cooling core 52 is disposed downstream of the battery cooling device 51 and the bypass passage 56 in the flow direction of the antifreeze.

In the thermal management system, the antifreeze circulating through the antifreeze circuit 5 and the antifreeze circulating though the heat dissipation circuit 3 have the same components. The components of the antifreeze circulating through the antifreeze circuit 5 may be different from the components of the antifreeze circulating through the heat dissipation circuit 3.

In the antifreeze circuit 5, the battery cooling device 51, the pipes 53, 54, 55, the bypass passage 56, the valve unit 57, and the second pump 58 are disposed in the powertrain compartment PR. The cooling core 52 is disposed in the passenger compartment CR. More specifically, the cooling core 52 is arranged in an instrument panel (not illustrated) in the passenger compartment CR. The instrument panel further has a ventilation duct 17 and an air conditioning device (not illustrated). Specifically, portions of the pipes 54, 55 connecting to or near the cooling core 52 extend in the instrument panel.

The battery 7 is disposed in the powertrain compartment PR. Although not illustrated, the battery 7 includes a plurality of battery cells. The battery 7 is chargeable with power, such as regenerative power generated by the travelling of the electric vehicle. The battery 7 supplies the charged power to devices, such as the travelling motor and the controller 15.

The battery 7 is assembled to the battery cooling device 51, or more specifically, to the cooling device main body 51*a*, by a heat conductive member 61 made of a copper plate or the like. The battery 7 may be directly assembled to the cooling device main body 51*a* without the heat conductive member 61.

The chiller 9 is disposed in the powertrain compartment PR. The chiller 9 includes a chiller main body 9*a*, the sixth inlet 9*b*, the sixth outlet 9*c*, the seventh inlet 9*d*, and the seventh outlet 9*e*. The refrigerant and the antifreeze flow inside the chiller main body 9*a*. The chiller main body 9*a* has the sixth inlet 9*b* on the upstream side in the flow direction of the refrigerant. The chiller main body 9*a* has the sixth outlet 9*c* on the downstream side in the flow direction of the refrigerant. The chiller main body 9*a* has the seventh inlet 9*d* on the upstream side in the flow direction of the antifreeze. The chiller main body 9*a* has the seventh outlet 9*e* on the downstream side in the flow direction of the antifreeze.

The sixth inlet 9*b* and the sixth outlet 9*c* of the chiller 9 are respectively connected to the pipe 24 and the pipe 25 of the refrigerant circuit 1. The seventh inlet 9*d* and the seventh outlet 9*e* of the chiller 9 are respectively connected to the pipe 55 and the upstream pipe 53*a* of the antifreeze circuit 5. Accordingly, the chiller 9 is connected to the refrigerant circuit 1 and the antifreeze circuit 5.

The first temperature sensor 11 is mounted to the battery 7. The first temperature sensor 11 directly measures the temperature of the battery 7. The second temperature sensor 13 is disposed in the ventilation duct 17. The second temperature sensor 13 directly measures the temperature of the air flowing through the ventilation duct 17.

The controller 15 is disposed in the powertrain compartment PR. The controller 15 is electrically connectable to the battery 7. The controller 15 is electrically connectable to the compressor 21, the expansion valve 26, the first pump 35, the first fan 36, the second pump 58, the second fan 60, the valve unit 57, the first temperature sensor 11, and the second temperature sensor 13.

The controller 15 supplies power to the compressor 21, the expansion valve 26, the first pump 35, the first fan 36, the second pump 58, the second fan 60, the valve unit 57, the first temperature sensor 11, and the second temperature sensor 13, and controls the valve unit 57 based on measurement results of the first temperature sensor 11 and the second temperature sensor 13. The controller 15 receives the data on the temperature of the battery 7 measured by the first temperature sensor 11 and the temperature of the air measured by the second temperature sensor 13. The controller 15 has a temperature threshold set for the battery 7. The controller 15 selects a first operation mode in which the battery 7 and the passenger compartment CR are cooled, a second operation mode in which the battery 7 is cooled while the passenger compartment CR is not cooled, or a third operation mode in which the battery 7 is not cooled while the passenger compartment CR is cooled. In such a manner, the controller 15 controls the thermal management system accordingly. Further details of the first operation mode, the second operation mode, and the third operation mode will be described later. The threshold is set accordingly.

The controller 15 is electrically connectable to devices, such as the air conditioning device and the travelling motor. Accordingly, the controller 15 is configured to control the electric vehicle as a whole including the thermal management system.

In the above-described thermal management system, the controller 15 selects the first operation mode, the second operation mode, or the third operation mode to selectively cool the battery 7 and/or the passenger compartment CR.

When the battery 7 and the passenger compartment CR are cooled, the controller 15 selects the first operation mode. The controller 15 then activates the compressor 21, the first pump 35, the second pump 58, the first fan 36, the second fan 60, the valve unit 57, and the first temperature sensor 11, and the second temperature sensor 13. The first temperature sensor 11 starts measuring the temperature of the battery 7, and the second temperature sensor 13 starts measuring the temperature of the air flowing through the ventilation duct 17.

Figure 2:
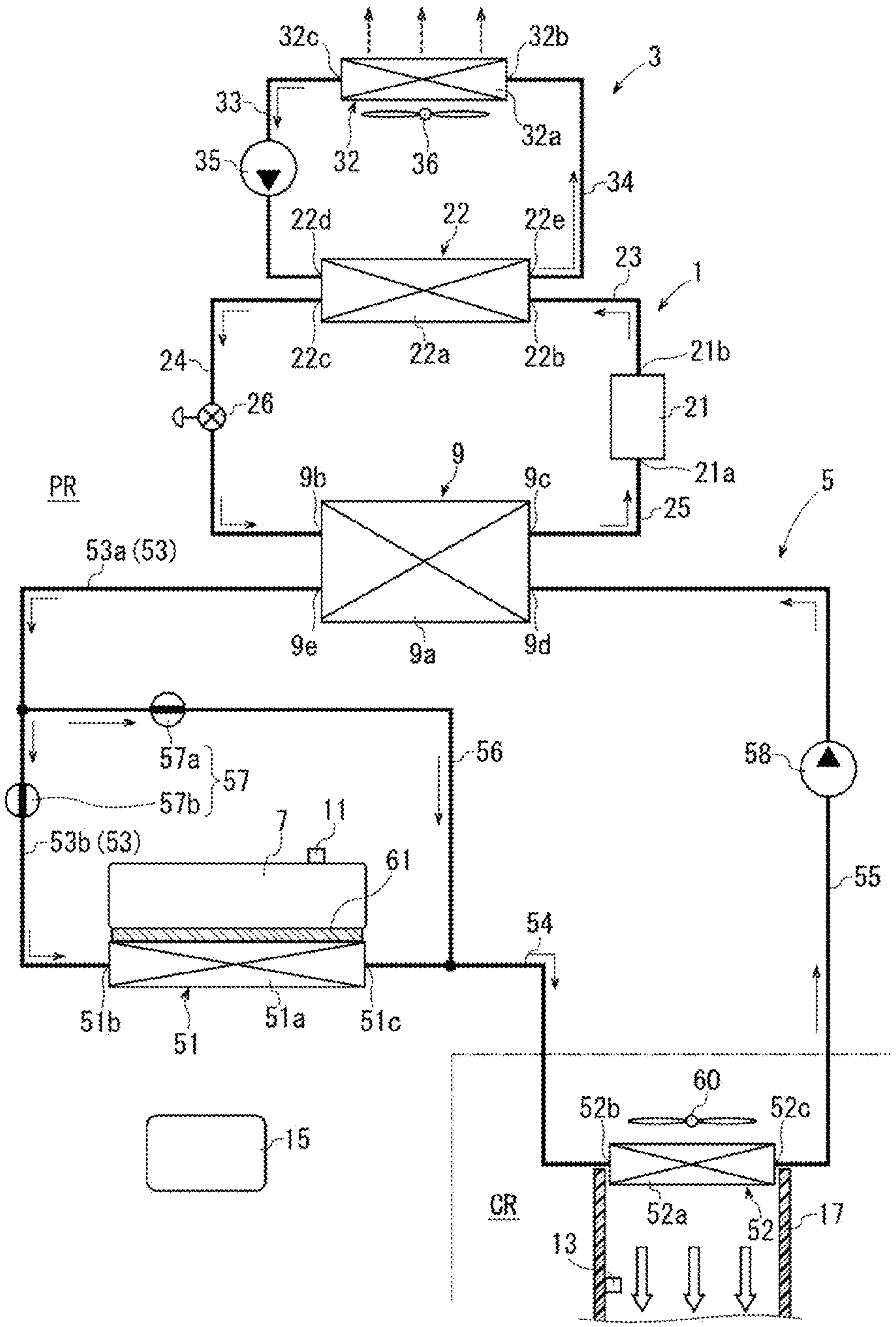
FIG. 2 is a schematic diagram of the thermal management system in a first operation mode.

As indicated by a solid arrow in FIG. 2, the antifreezes begin to circulate in the heat dissipation circuit 3 and the antifreeze circuit 5, respectively. In the refrigerant circuit 1, the compressor 21 starts compressing the refrigerant, so that the refrigerant at high temperature and high pressure is discharged from the discharge port 21*b*. The refrigerant at high temperature and high pressure flows through the pipe 24, and flows into the condenser main body 22*a* through the first inlet 22*b* of the condenser 22. Accordingly, the condenser 22 transfers heat between the refrigerant circulating in the refrigerant circuit 1 and the antifreeze circulating in the heat dissipation circuit 3.

The antifreeze heated by the heat transfer in the condenser 22 flows from the second outlet 22*e* of the condenser 22 into the third inlet 32*b* of the radiator main body 32*a* of the radiator 32 through the pipe 34. Accordingly, the radiator 32 transfers heat from the antifreeze in the radiator main body 32*a* to the air surrounding the radiator 32 to cool the antifreeze. The cooled antifreeze flows from the third outlet 32*c* of the radiator 32 into the first inlet 22*b* of the condenser main body 22*a* through the pipe 33. The air heated by the heat transfer in the radiator 32 is discharged outside the electric vehicle by the first fan 36 as indicated by a dashed arrow in FIG. 2.

In the refrigerant circuit 1, the refrigerant cooled by the heat transfer in the condenser main body 22*a* flows from the first outlet 22*c* of the condenser 22, and flows through the pipe 24. The refrigerant is depressurized by the expansion valve 26, and flows into the sixth inlet 9*b* of the chiller main body 9*a* of the chiller 9. The chiller 9 transfers heat between the antifreeze circulating in the antifreeze circuit 5 and the refrigerant at low temperature and low pressure circulating in the refrigerant circuit 1. The refrigerant then flows from the sixth outlet 9*c* of the chiller 9 into the pipe 25. The refrigerant further flows into the compressor 21 through the suction port 21*a*. The refrigerant is compressed by the compressor 21 again and discharged from the discharge port 21*b*.

The antifreeze cooled by the heat transfer in the chiller 9 flows from the seventh outlet 9*e* of the chiller 9 into the upstream pipe 53*a* of the pipe 53. In the first operation mode, the controller 15 opens the first flow control valve 57*a* and the second flow control valve 57*b* of the valve unit 57. Accordingly, in the first operation mode, the antifreeze cooled by the chiller 9 flows through the upstream pipe 53*a* and branches into the downstream pipe 53*b* and the bypass passage 56. When the controller 15 maximizes the open degree of each of the first flow control valve 57*a* and the second flow control valve 57*b*, the flow rate of the antifreeze flowing from the upstream pipe 53*a* to the downstream pipe 53*b* becomes approximately equal to the flow rate of the antifreeze flowing from the upstream pipe 53*a* to the bypass passage 56.

The antifreeze in the downstream pipe 53*b* flows into the fourth inlet 51*b* of the cooling device main body 51*a* of the battery cooling device 51. The battery cooling device 51 transfers heat between the battery 7 and the antifreeze flowing in the cooling device main body 51*a*, i.e., the antifreeze cooled by the chiller 9. In such a manner, the thermal management system cools the battery 7.

After the heat transfer with battery 7, the antifreeze flows from the fourth outlet 51*c* to the cooling core 52 through the pipe 54. This antifreeze has received heat from the battery 7 in the cooling device main body 51*a*. Accordingly, the antifreeze from the fourth outlet 51*c* has a temperature higher than the temperature of the antifreeze when the antifreeze flows into the cooling device main body 51*a* through the fourth inlet 51*b*, i.e., the temperature of the antifreeze when the antifreeze is cooled by the chiller 9.

The antifreeze partly flows into the pipe 54 through the bypass passage 56 while bypassing the battery cooling device 51. The heat of the antifreeze flowing through the bypass passage 56 is not transferred to the battery 7 in the battery cooling device 51, so that the antifreeze maintains low temperature.

The antifreeze that flows through the bypass passage 56 merges with the antifreeze that flows from the fourth outlet 51*c* of the battery cooling device 51 in the pipe 54, and flows into the fifth inlet 52*b* of the cooling core main body 52*a* of the cooling core 52. Although the temperature of the antifreeze that flows from the fourth outlet 51*c* has been increased by the heat transfer with the battery 7, the temperature of the antifreeze is decreased by the antifreeze that has flowed through the bypass passage 56, so that the antifreeze at a decreased temperature flows into the fifth inlet 52*b* of the cooling core main body 52*a*.

The cooling core 52 transfers heat between the air surrounding the cooling core main body 52*a*, i.e., the cooling core 52, and the antifreeze in the cooling core main body 52*a*. Accordingly, the cooling core 52 cools the air surrounding the cooling core 52. The cooled air is drawn into the ventilation duct 17 by the second fan 60 and supplied into the passenger compartment CR through the ventilation duct 17, as indicated by hollow arrows in FIG. 2. In such a manner, the thermal management system cools the passenger compartment CR.

After the heat transfer with the air surrounding the cooling core 52, the antifreeze flows from the fifth outlet 52*c* to the chiller 9 through the pipe 55.

When the controller 15 selects the first operation mode so that the battery 7 and the passenger compartment CR are simultaneously cooled, the controller 15 of the thermal management system determines a level of cooling required to cool the battery 7 based on the temperature of the battery 7 measured by the first temperature sensor 11. Similarly, the controller 15 determines a level of cooling required to cool the air flowing through the ventilation duct 17 based on the temperature of the air measured by the second temperature sensor 13 and the room temperature of the passenger compartment CR set by the air conditioning device. The controller 15 adjusts the open degree of each of the first flow control valve 57*a* and the second flow control valve 57*b* based on a comparison between the level of cooling required to cool the battery 7 and the level of cooling required to cool the air flowing through the ventilation duct 17. The controller 15 sets a temperature of the antifreeze cooled by the chiller 9 accordingly based on the comparison between the level of cooling required to cool the battery 7 and the level of cooling required to cool the air flowing through the ventilation duct 17. The controller 15 adjusts the open degree of the expansion valve 26 so that the antifreeze is cooled to the set temperature.

When the level of cooling required to cool the battery 7 is greater than the level of cooling required to cool the air flowing through the ventilation duct 17, the controller 15 increases the open degree of the second flow control valve 57*b* to be greater than the open degree of the first flow control valve 57*a*. This causes the flow rate of the antifreeze flowing through the downstream pipe 53*b* to be greater than the flow rate of the antifreeze flowing through the bypass passage 56. When the level of cooling required to cool the air flowing through the ventilation duct 17 is greater than the level of cooling required to cool the battery 7, the controller 15 increases the open degree of the first flow control valve 57*a* to be greater than the open degree of the second flow control valve 57*b*. This causes the flow rate of the antifreeze flowing through the bypass passage 56 to be greater than the flow rate of the antifreeze flowing through the downstream pipe 53*b*. In the first operation mode, the controller 15 does not close the first flow control valve 57*a* and the second flow control valve 57*b*. Accordingly, in the first operation mode, the antifreeze cooled by the chiller 9 flows through the downstream pipe 53*b* or the bypass passage 56 even when the flow rate of the antifreeze flowing through the downstream pipe 53*b* and the flow rate of the antifreeze flowing through the bypass passage 56 are different.

In such a manner, when the controller 15 increases the open degree of the second flow control valve 57*b* to be greater than the open degree of the first flow control valve 57*a*, the flow rate of the antifreeze receiving heat from the battery 7 in the battery cooling device 51 increases. This allows the battery 7 to be cooled satisfactorily. However, this causes the flow rate of the antifreeze flowing from the fourth outlet 51*c* to the pipe 54 to be greater than the flow rate of the antifreeze flowing through the bypass passage 56 to the pipe 54, thereby slightly increasing the temperature of the antifreeze flowing into the cooling core 52. That is, in the first operation mode, the cooling of the battery 7 is prioritized over the cooling of the passenger compartment CR.

In contrast, when the controller 15 increases the open degree of the first flow control valve 57*a* to be greater than the open degree of the second flow control valve 57*b*, the flow rate of the antifreeze receiving heat from the battery 7 in the battery cooling device 51 decreases. However, this allows the temperature of the antifreeze to more decrease while preventing frost from forming on the cooling core 52. That is, in the first operation mode, the cooling of the passenger compartment CR is prioritized over the cooling of the battery 7.

In the first operation mode, when the temperature of the battery 7 measured by the first temperature sensor 11 is higher than the threshold, the controller 15 determines that an enhanced level of cooling is required to cool the battery 7. In this case, the controller 15 adjusts the open degree of the expansion valve 26 to cool the antifreeze to a temperature lower than 0° C. by the heat transfer in the chiller 9. Furthermore, the controller 15 maximizes the open degree of the second flow control valve 57*b*, and adjusts the open degree of the first flow control valve 57*a* to an open degree lower than the maximum open degree of the first flow control valve 57*a* so that the open degree of the second flow control valve 57*b* is greater than the open degree of the first flow control valve 57*a*.

This allows the battery cooling device 51 to cool the battery 7 by transferring heat from the battery 7 to the antifreeze cooled to a temperature lower than 0° C., thereby cooling the battery 7 satisfactorily even if the temperature of the battery 7 is higher than the threshold.

When the antifreeze is cooled to a temperature lower than 0° C. in the chiller 9, the antifreeze at a temperature lower than 0° C. flows into the pipe 54 through the bypass passage 56. In contrast, the antifreeze flowing from the fourth outlet 51*c* into the pipe 54 receives heat from the battery 7 in the battery cooling device 51, so that the antifreeze at a temperature higher than 0° C. flows into the pipe 54. Since the controller 15 increases the open degree of the second flow control valve 57*b* to be greater than the open degree of the first flow control valve 57*a*, the flow rate of the antifreeze receiving heat from the battery 7 and flowing from the fourth outlet 51*c* into the pipe 54 is higher than the flow rate of the antifreeze flowing from the bypass passage 56 into the pipe 54.

The antifreeze flowing from the bypass passage 56 merges with the antifreeze flowing from the fourth outlet 51*c* of the battery cooling device 51 in the pipe 54, so that the antifreeze warmed to a temperature higher than 0° C. flows into the cooling core 52.

Thus, in the thermal management system according to the present disclosure, the antifreeze at a temperature equal to or lower than 0° C. is unlikely to flow into the cooling core 52 even if the antifreeze is cooled to a temperature lower than 0° C. in the chiller 9. Specifically, the controller 15 controls the valve unit 57 so that the temperature of the antifreeze flowing through the cooling core 52 does not decrease to a temperature equal to or lower than 0° C. when the cooling core 52 cools the air. This therefore inhibits the flow of the antifreeze at a temperature equal to or lower than 0° C. through the cooling core main body 52*a*, thereby preventing the air surrounding the cooling core 52 from being excessively cooled by the heat transfer in the cooling core 52. This therefore prevents moisture in the air from becoming frost on the cooling core main body 52*a*.

In the thermal management system, the controller 15 selects the second operation mode when cooling of the passenger compartment CR is not required. In the second operation mode, the controller 15 activates the compressor 21, the first pump 35, the second pump 58, the first fan 36, the valve unit 57, and the first temperature sensor 11.

Figure 3:
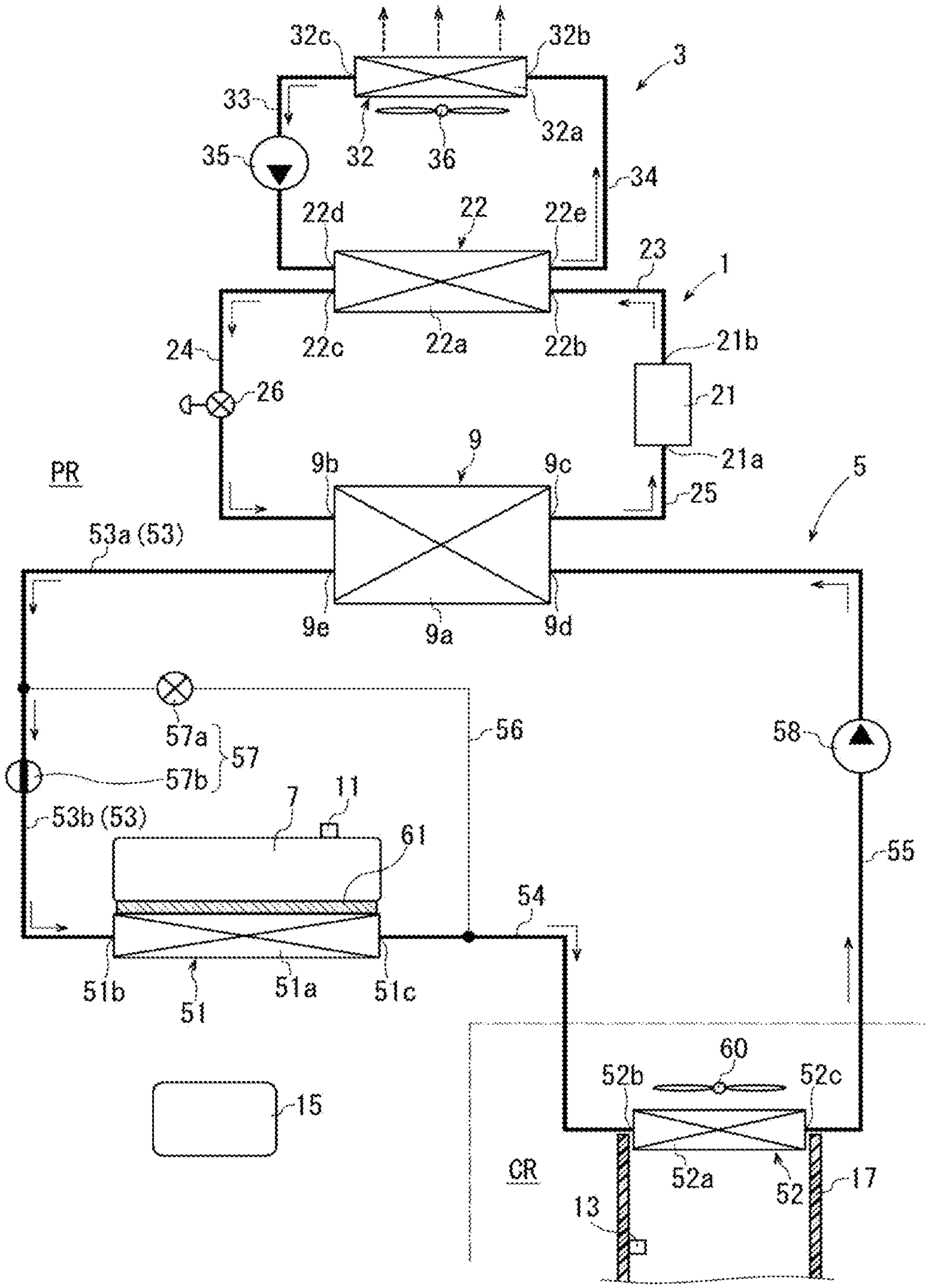
FIG. 3 is a schematic diagram of the thermal management system in a second operation mode.

In the second operation mode as well as the first operation mode, the refrigerant circulates through the refrigerant circuit 1 and the antifreeze circulates through the heat dissipation circuit 3 as illustrated in FIG. 3. Accordingly, in the second operation mode, the refrigerant is cooled in the condenser 22.

In the second operation mode, the controller 15 maximizes the open degree of the second flow control valve 57*b* and sets the open degree of the first flow control valve 57*a* to zero degrees. Accordingly, the first flow control valve 57*a* closes the bypass passage 56. That is, in the second operation mode, the valve unit 57 maximizes the flow rate of the antifreeze flowing through the battery cooling device 51, while minimizing the flow rate of the antifreeze flowing through the bypass passage 56, for example, reducing the flow rate of the antifreeze flowing through the bypass passage 56 to zero. Accordingly, in the second operation mode, the antifreeze circulating through the antifreeze circuit 5 does not flow through the bypass passage 56, and flows though the chiller 9, the battery cooling device 51, and the cooling core 52 in this order. In the second operation mode, the passenger compartment CR is not cooled, so that the antifreeze cooled in the chiller 9 does not need to bypass the battery cooling device 51 through the bypass passage 56.

Accordingly, the battery 7 is satisfactorily cooled by the heat transfer with the antifreeze in the battery cooling device 51 in the second operation mode. In the second operation mode, the antifreeze does not flow through the bypass passage 56, and is heated by the heat transfer with the battery 7. Accordingly, the antifreeze with high temperature flows into the cooling core 52 from the fourth outlet 51*c* through the pipe 54. In the second operation mode, the controller 15 does not operate the second fan 60, and the air surrounding the cooling core 52 is therefore not supplied into the passenger compartment CR.

In the second operation mode, the battery 7 is cooled in the battery cooling device 51 and the antifreeze is cooled to a temperature lower than 0° C. in the chiller 9 if the first temperature sensor 11 indicates the temperature of the battery 7 higher than the threshold. In the first operation mode, if the controller 15 determines that the antifreeze cooled to a temperature lower than 0° C. in the chiller 9 does not sufficiently cool the battery 7, the controller 15 selects the second operation mode so that only the battery 7 is cooled.

In the thermal management system according to the present embodiment, the controller 15 selects the third operation mode when cooling of the battery 7 is not required. In the third operation mode, the controller 15 activates the compressor 21, the first pump 35, the second pump 58, the first fan 36, the second fan 60, the valve unit 57, and the second temperature sensor 13.

Figure 4:
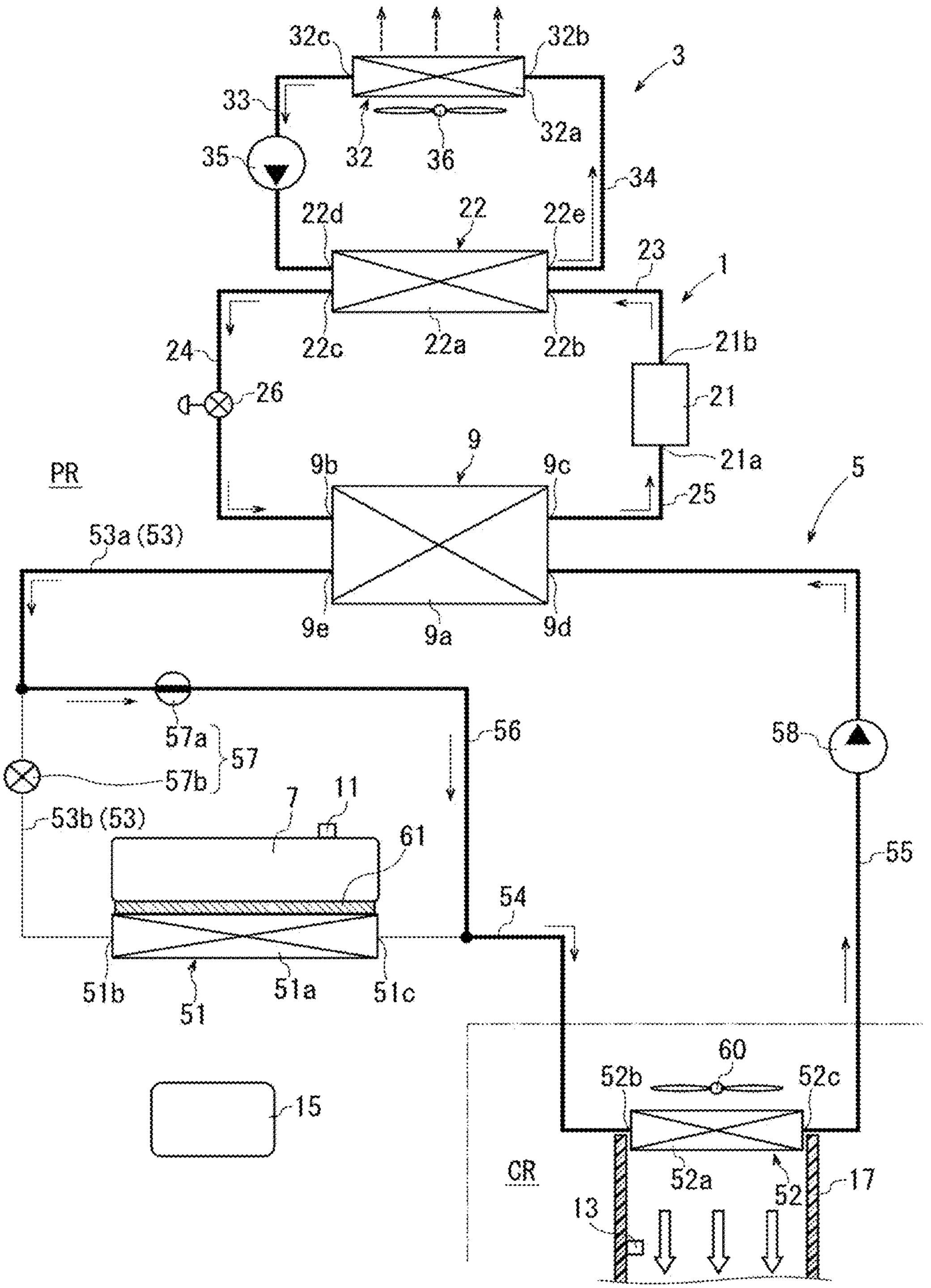
FIG. 4 is a schematic diagram of the thermal management system in a third operation mode.

In the third operation mode as well as the first operation mode and the second operation mode, the refrigerant circulates through the refrigerant circuit 1 and the antifreeze circulates through the heat dissipation circuit 3 as illustrated in FIG. 4. Accordingly, in the third operation mode, the refrigerant is cooled in the condenser 22.

In the third operation mode, the controller 15 maximizes the open degree of the first flow control valve 57*a* and sets the open degree of the second flow control valve 57*b* to zero degrees. Accordingly, the second flow control valve 57*b* closes the downstream pipe 53*b*. That is, in the third operation mode, the valve unit 57 maximizes the flow rate of the antifreeze flowing through the bypass passage 56, while minimizing the flow rate of the antifreeze flowing through the battery cooling device 51, for example, reducing the flow rate of the antifreeze flowing through the battery cooling device 51 to zero. Accordingly, in the third operation mode, the antifreeze circulating through the antifreeze circuit 5 does not flow through the battery cooling device 51, and flows though the chiller 9, the bypass passage 56, and the cooling core 52 in this order.

When only the cooling of the passenger compartment CR is required, the antifreeze cooled by the chiller 9 does not need to flow into the battery cooling device 51. This eliminates the need to cool the antifreeze to a temperature lower than 0° C. in the chiller 9. In the third operation mode, the battery 7 is not cooled, so that the antifreeze flowing through the bypass passage 56 is not heated before flowing into the cooling core 52. This eliminates the need to cool the antifreeze to a temperature lower than 0° C. in the chiller 9. Accordingly, in the third operation mode, the chiller 9 cools the antifreeze to a temperature higher than 0° C. In other words, the controller 15 adjusts the open degree of the expansion valve 26 so that the antifreeze is not cooled to a temperature lower than 0° C. by the heat transfer in the chiller 9. This allows satisfactory cooling of the passenger compartment CR while preventing frost from forming on the cooling core 52.

Accordingly, in the third operation mode, the air is cooled satisfactorily by the heat transfer with the antifreeze in the cooling core 52, and the passenger compartment CR is therefore cooled satisfactorily. Furthermore, the antifreeze at a temperature higher than 0° C. flows into the cooling core 52. Accordingly, frost does not easily form on the cooling core main body 52*a* in the thermal management system in the third operation mode.

In the thermal management system, the antifreeze circuit 5 includes the cooling core 52. The air cooled by the heat transfer with the antifreeze in the cooling core 52 is supplied to the passenger compartment CR to cool the passenger compartment CR. This eliminates the need for heat transfer from the air to refrigerant in the cooling core 52 to cool the passenger compartment CR. That is, the thermal management system cools the passenger compartment CR without heat transfer from the air to the refrigerant to cool the air. This allows the cooling core 52 to be disposed in the passenger compartment CR while allowing the thermal management system to use propane having a high flammability as a refrigerant circulating through the refrigerant circuit 1.

Furthermore, in the thermal management system in the first operation mode, the antifreeze is partly heated by the heat transfer with the battery 7 in the battery cooling device 51. The antifreeze flowing from the bypass passage 56 merges with the antifreeze flowing from the fourth outlet 51*c* of the battery cooling device 51 in the pipe 54, and further flows into the cooling core 52. This inhibits the increase in the temperature of the antifreeze for cooling the air in the cooling core 52 to a temperature equal to or lower than 0° C. even when the thermal management system in the first operation mode cools the battery 7 and the passenger compartment CR while cooling the temperature of the antifreeze to a temperature lower than 0° C. simultaneously. Accordingly, frost does not easily form on the cooling core main body 52*a* of the cooling core 52. The thermal management system therefore satisfactorily cools the air to be supplied to the passenger compartment CR by the heat transfer in the cooling core 52.

Accordingly, the thermal management system is capable of satisfactorily cooling the battery 7 and the passenger compartment CR. In the thermal management system according to the present embodiment, the antifreeze circuit 5 does not need another chiller in addition to the chiller 9 so as to separately cool the antifreeze for cooling the battery 7 and the antifreeze for cooling the passenger compartment CR. This eliminates the need for an increase in the size of the thermal management system.

Accordingly, the thermal management system for a vehicle according to the present embodiment has excellent battery cooling performance for the battery 7 and passenger compartment cooling performance for the passenger compartment CR while using a refrigerant with a high flammability, and the thermal management system is easy to install in an electric vehicle.

In particular, in the thermal management system in the second operation mode, the controller 15 maximizes the open degree of the second flow control valve 57*b* and sets the open degree of the first flow control valve 57*a* to zero degrees. Accordingly, the thermal management system in the second operation mode allows the antifreeze cooled by the chiller 9 to be wholly used to cool the battery 7, thereby allowing sufficient cooling of the battery 7.

Furthermore, in the thermal management system in the third operation mode, the controller 15 maximizes the open degree of the first flow control valve 57*a* and sets the open degree of the second flow control valve 57*b* to zero degrees. This prevents the antifreeze cooled in the chiller 9 from flowing into the battery cooling device 51 through the downstream pipe 53*b*, thereby preventing the antifreeze from unnecessarily increasing its temperature before flowing into the cooling core 52. In the third operation mode, this therefore allows satisfactory cooling of the passenger compartment CR.

Although the present disclosure has been described based on the above embodiment, the present disclosure is not limited to the above embodiment, and may be modified within the scope of the present disclosure.

For example, the thermal management system according to the present embodiment uses propane as a refrigerant circulating through the refrigerant circuit 1, but not limited thereto. The refrigerant may be toxic, and ammonia may be used, for example.

The thermal management system according to the present embodiment includes the heat dissipation circuit 3, and cools the refrigerant by heat transfer between the refrigerant and the antifreeze circulating through the heat dissipation circuit 3 in the condenser 22. However, the thermal management system may not include the heat dissipation circuit 3 and may cool the refrigerant by heat transfer with the air outside the electric vehicle in the condenser 22.

The thermal management system according to the present embodiment includes the valve unit 57 serving as the flow rate adjustor of the present disclosure. However, the thermal management system may not include the second flow control valve 57*b*, and the first flow control valve 57*a* provided in the bypass passage 56 may serve as the flow rate adjustor of the present disclosure. In this configuration, the antifreeze is cooled in the chiller 9 and partly flows into the downstream pipe 53*b* through the upstream pipe 53*a*, but the first flow control valve 57*a* adjusts the flow rate of the antifreeze flowing into the bypass passage 56 from the upstream pipe 53*a*.

The thermal management system may include the flow rate adjustor of the present disclosure instead of the valve unit 57 at a position where the upstream pipe 53*a*, the downstream pipe 53*b*, and the bypass passage 56 are connected. This flow rate adjustor preferably selects a required flow of the antifreeze from the flow of the antifreeze from the upstream pipe 53*a* to the bypass passage 56 only, the flow of the antifreeze from the upstream pipe 53*a* to the downstream pipe 53*b* only, and the flows of the antifreeze from the upstream pipe 53*a* to the bypass passage 56 and the downstream pipe 53*b*, and adjusts the flow rate of the antifreeze flowing through the bypass passage 56 and the flow rate of the antifreeze flowing through the downstream pipe 53*b*.

The thermal management system according to the present embodiment cools the battery 7 and the passenger compartment CR with the antifreeze circulating through the antifreeze circuit 5. However, the thermal management system according to the present embodiment may also cool the electrical equipment, such as the motor generator, and the controller 15 with the antifreeze circulating through the antifreeze circuit 5.

In the thermal management system according to the present embodiment, the controller 15 controls the electric vehicle as a whole including the thermal management system. However, the controller 15 may control the thermal management system only.

In the thermal management system according to the present embodiment, the first temperature sensor 11 is mounted on the battery 7 to directly measure the temperature of the battery 7. However, the first temperature sensor 11 may measure the temperature of the battery 7 based on the temperature of the antifreeze flowing from the fourth inlet 51*b* into the cooling device main body 51*a* and the temperature of the antifreeze flowing from the fourth outlet 51*c* into the pipe 54. Similarly, the second temperature sensor 13 may measure the temperature of the air supplied to the passenger compartment CR based on the temperature of the antifreeze flowing from the fifth inlet 52*b* into the cooling core main body 52*a* and the temperature of the antifreeze flowing from the fifth outlet 52*c* into the pipe 55.

The thermal management system according to the present embodiment may allow the antifreeze cooled by the chiller 9 to partly flow into the battery cooling device 51 even if the main purpose is to cool the passenger compartment CR. This allows the antifreeze flowing from the fourth outlet 51*c* of the battery cooling device 51 to merge with the antifreeze flowing from the bypass passage 56 to prevent the flow of the antifreeze at a temperature equal to or lower than 0° C. in the cooling core 52, even if the antifreeze is cooled to a temperature lower than 0° C. in the chiller 9.

The present disclosure is applicable to a vehicle, such as an electric vehicle or a hybrid vehicle.

What is claimed is:

1. A thermal management system for a vehicle, the thermal management system comprising:

a refrigerant circuit through which a refrigerant circulates;

an antifreeze circuit through which an antifreeze circulates;

a battery for supplying power to the vehicle; and a chiller connected to the refrigerant circuit and the antifreeze circuit, the chiller being configured to transfer heat between the antifreeze and the refrigerant to cool the antifreeze, wherein the refrigerant has flammability or toxicity, the refrigerant circuit includes: a compressor for compressing the refrigerant; a first heat exchanger for cooling the refrigerant compressed by the compressor; and an expansion valve for depressurizing the cooled refrigerant and directing the depressurized refrigerant to the chiller, the antifreeze circuit includes:

a second heat exchanger disposed downstream of the chiller in a flow direction of the antifreeze, and configured to transfer heat between the battery and the antifreeze to cool the battery;

a cooling core disposed in a passenger compartment of the vehicle, the cooling core being disposed downstream of the second heat exchanger in the flow direction of the antifreeze and configured to transfer heat between air supplied to the passenger compartment and the antifreeze to cool the air;

a first flow passage connected to the chiller and the second heat exchanger;

a second flow passage connected to the second heat exchanger and the cooling core;

a third flow passage connected to the cooling core and the chiller;

a bypass passage through which the antifreeze flows toward the cooling core while bypassing the second heat exchanger; and a flow rate adjustor configured to adjust a flow rate of the antifreeze that flows through the second heat exchanger and a flow rate of the antifreeze that flows through the bypass passage, the thermal management system includes:

a first temperature sensor for measuring a temperature of the battery;

a second temperature sensor for measuring a temperature of the air; and a controller connected to the first temperature sensor, the second temperature sensor, and the flow rate adjustor, and configured to control the flow rate adjustor based on measurement results of the first temperature sensor and the second temperature sensor, an upstream end and a downstream end of the bypass passage in the flow direction of the antifreeze are respectively connected to the first flow passage and the second flow passage, and the controller controls the flow rate adjustor so that a temperature of the antifreeze flowing through the cooling core does not decrease to a temperature equal to or lower than 0° C. when the cooling core cools the air.

2. The thermal management system according to claim 1, wherein the controller selects a first operation mode in which the battery and the passenger compartment are cooled, a second operation mode in which the battery is cooled while the passenger compartment is not cooled, or a third operation mode in which the battery is not cooled while the passenger compartment is cooled, in the second operation mode, the flow rate adjustor maximizes the flow rate of the antifreeze flowing through the second heat exchanger, while minimizing the flow rate of the antifreeze flowing through the bypass passage, and in the third operation mode, the flow rate adjustor maximizes the flow rate of the antifreeze flowing through the bypass passage, while minimizing the flow rate of the antifreeze flowing through the second heat exchanger.

3. The thermal management system according to claim 2, wherein in the second operation mode, the flow rate adjustor reduces the flow rate of the antifreeze flowing through the bypass passage to zero, and in the third operation mode, the flow rate adjustor reduces the flow rate of the antifreeze flowing through the second heat exchanger to zero, and the chiller cools the antifreeze to a temperature higher than 0° C.

* * * * *